(12) United States Patent
Rust et al.

(10) Patent No.: US 10,064,712 B2
(45) Date of Patent: Sep. 4, 2018

(54) AVIAN BEAK TRIMMING DEVICE

(71) Applicant: Rose Acre Farms, Inc., Seymour, IN (US)

(72) Inventors: Marcus D. Rust, Remington, IN (US); Leslie Ezra, Winamac, IN (US)

(73) Assignee: Rose Acre Farms, Inc., Seymour, IN (US)

( * ) Notice: Subject to any disclaimer, the term of this patent is extended or adjusted under 35 U.S.C. 154(b) by 348 days.

(21) Appl. No.: 14/731,243

(22) Filed: Jun. 4, 2015

(65) Prior Publication Data

US 2016/0354189 A1 Dec. 8, 2016

(51) Int. Cl.
*A61D 1/00* (2006.01)
*A01K 45/00* (2006.01)
*A01K 39/014* (2006.01)

(52) U.S. Cl.
CPC ............ *A61D 1/005* (2013.01); *A01K 39/014* (2013.01); *A01K 45/00* (2013.01)

(58) Field of Classification Search
CPC ...... A01K 39/00; A01K 39/01; A01K 39/012; A01K 39/014
USPC .................. 119/70, 52.1, 52.4, 53.5, 54, 61.4
See application file for complete search history.

(56) References Cited

U.S. PATENT DOCUMENTS

| | | | | |
|---|---|---|---|---|
| 1,933,926 A | * | 11/1933 | Olson | A01K 39/012 119/55 |
| 2,699,250 A | | 1/1955 | Keen et al. | |
| 2,806,447 A | | 9/1957 | Bryan et al. | |
| 4,351,273 A | | 9/1982 | Holland et al. | |
| 5,235,934 A | * | 8/1993 | Runion | A01K 39/0125 119/464 |
| 5,255,631 A | * | 10/1993 | Anderson | A01K 39/012 119/52.2 |
| 2010/0146867 A1 | * | 6/2010 | Boden | B24D 3/00 51/309 |
| 2013/0139755 A1 | * | 6/2013 | Steudler, Jr. | A01K 39/012 119/51.01 |
| 2013/0269619 A1 | | 10/2013 | Hung | |
| 2016/0354189 A1 | | 12/2016 | Rust et al. | |

FOREIGN PATENT DOCUMENTS

| WO | 2015/173170 | 11/2015 |
|---|---|---|
| WO | 201517310 A1 | 11/2015 |

OTHER PUBLICATIONS

Unknown, Opinion of the Scientific Panel on Animal Health and Welfare on a request from the Commission related to the welfare aspects of various systems of keeping laying hens, The welfare aspects of various systems of keeping laying hens, 2005, pp. 1-23, 197, The EFSA Journal.
Stuart Lumb, Blunting Laying Hens' Beaks Instead of Trimming, World Poultry, 2006, pp. 13, vol. 22 No. 6.
Defra, Science Directorate, Management Support and Finance Team, Sid 5 Research Project Final Report, 2005, pp. 1-24, Defra.

* cited by examiner

*Primary Examiner* — Kathleen Holwerda
*Assistant Examiner* — Sarah Simpson
(74) *Attorney, Agent, or Firm* — Ice Miller LLP (57) ABSTRACT

A beak trimming device is provided. The device includes a trough operative to receive an avian attractant. The trough has an inner surface. The inner surface includes one or more abrasive surfaces configured to contact and trim a beak of a bird accessing the attractant at the trough. In some embodiments, the attractant is feed.

33 Claims, 6 Drawing Sheets

AVIAN BEAK TRIMMING DEVICE

TECHNICAL FIELD OF THE DISCLOSED EMBODIMENTS

The embodiments herein generally relate to animal husbandry devices and, more particularly, to avian beak trimming devices.

BACKGROUND OF THE DISCLOSED EMBODIMENTS

Beak trimming involves removal of part of the beak of avians such as poultry, especially layer hens and turkeys, although it may also be performed on quail, ducks, and other species. In aviaries, birds often need to have their beaks trimmed in order to prevent injury to themselves or other birds. Beak trimming is typically done manually using a heated blade or infrared treatment. However, such manual methods are very labor intensive and expensive.

A need remains for a device that is inexpensive and requires minimal labor to trim the beaks of birds.

SUMMARY OF THE DISCLOSED EMBODIMENTS

In an embodiment, a beak trimming device is disclosed comprising: a trough including an interior cavity formed from at least one inner surface, the interior cavity having an interior cavity proximal end and an interior cavity distal end, wherein the interior cavity is constructed and arranged to hold a quantity of avian attractant therein; and an abrasive surface disposed on at least a portion of the at least one inner surface, the abrasive surface constructed and arranged to remove material incrementally from an avian beak that is moved across the abrasive surface when accessing the avian attractant.

In a further embodiment of the above, an attractant storage container including an opening therein is provided, wherein the attractant storage container is disposed with respect to the trough such that attractant within the attractant storage container may pass through the opening into the interior cavity of the trough.

In a further embodiment of any of the above, the trough is operably coupled to the attractant storage container, wherein the coupling of the trough and attractant storage container is constructed and arranged such that attractant within the attractant storage container will move through the opening and into the trough by force of gravity.

In a further embodiment of any of the above, the trough is constructed and arranged to move attractant to the interior cavity proximal end upon the contact of the beak with the at least one inner surface.

In a further embodiment of any of the above, the trough is pivotally connected to the attractant storage container, and the trough is configured to pivot away from the opening upon the contact of the beak with the at least one inner surface.

In a further embodiment of any of the above, a bracket operably couples the trough to the attractant storage container, wherein the bracket is constructed and arranged such that attractant within the attractant storage container will move through the opening and into the trough by force of gravity.

In a further embodiment of any of the above, the bracket is constructed and arranged to allow the trough to pivot between a first position and a second position.

In a further embodiment of any of the above, the trough is configured to pivot to the second position upon the contact of the beak with the at least one inner surface.

In a further embodiment of any of the above, the trough includes a biasing member coercing the trough toward the first position.

In a further embodiment of any of the above, the biasing member is selected from the group consisting of: a weight, a mechanical spring, and a gas spring.

In a further embodiment of any of the above, the trough further includes a first pivot stop determining the first position and a second pivot stop determining the second position.

In a further embodiment of any of the above, the at least one inner surface comprises an inner bottom surface, an inner proximal surface, an inner first side surface, and an inner second side surface.

In a further embodiment of any of the above, the abrasive surface is disposed on at least a portion of at least one of the inner bottom surface, the inner proximal surface, the inner first side surface, and the inner second side surface.

In a further embodiment of any of the above, the abrasive surface comprises an abrasive grit applied to at least a portion of the at least one inner surface.

In a further embodiment of any of the above, the abrasive surface comprises a roughening of a surface of at least a portion of the at least one inner surface.

In a further embodiment of any of the above, the abrasive surface comprises at least one ridge disposed on at least a portion of the at least one inner surface.

In a further embodiment of any of the above, the at least one ridge comprises a plurality of ridges disposed on at least a portion of the at least one inner surface.

In a further embodiment of any of the above, the at least one inner surface comprises an inner bottom surface, an inner proximal surface, an inner first side surface, and an inner second side surface.

In a further embodiment of any of the above, the plurality of ridges are disposed on at least a portion of at least one of the inner bottom surface, the inner proximal surface, the inner first side surface, and the inner second side surface.

In a further embodiment of any of the above, a plurality of slots are formed through at least a portion of the at least one inner surface, wherein the plurality of ridges comprises material of the at least one inner surface adjacent a respective one of the plurality of slots bent away from a plane of the at least one inner surface.

In a further embodiment of any of the above, a quantity of avian attractant is disposed in the interior cavity.

In a further embodiment of any of the above, the attractant is selected from the group consisting of: avian feed, water, treat, and grit.

In another embodiment, a beak trimming device is disclosed comprising: a trough including an interior cavity formed from at least one inner surface, the interior cavity having an interior cavity proximal end and an interior cavity distal end; an attractant storage container including an opening therein, wherein the attractant storage container is disposed with respect to the trough such that avian attractant within the attractant storage container may pass through the opening into the interior cavity of the trough; and an abrasive surface disposed on at least a portion of the at least one inner surface, the abrasive surface constructed and arranged to remove material incrementally from an avian beak that is moved across the abrasive surface when accessing the avian attractant.

In a further embodiment of any of the above, the trough is operably coupled to the attractant storage container, wherein the coupling of the trough and the attractant storage container is constructed and arranged such that attractant within the attractant storage container will move through the opening and into the trough by force of gravity.

In a further embodiment of any of the above, the trough is constructed and arranged to move attractant to the interior cavity proximal end upon the contact of the beak with the at least one inner surface.

In a further embodiment of any of the above, the trough is pivotally connected to the attractant storage container, and the trough is configured to pivot away from the opening upon the contact of the beak with the at least one inner surface.

In a further embodiment of any of the above, a bracket operably couples the trough to the attractant storage container, wherein the bracket is constructed and arranged such that attractant within the attractant storage container will move through the opening and into the trough by force of gravity.

In a further embodiment of any of the above, the bracket is constructed and arranged to allow the trough to pivot between a first position and a second position.

In a further embodiment of any of the above, the trough is configured to pivot to the second position upon the contact of the beak with the at least one inner surface.

In a further embodiment of any of the above, the trough includes a biasing member coercing the trough toward the first position.

In a further embodiment of any of the above, the biasing member is selected from the group consisting of: a weight, a mechanical spring, and a gas spring.

In a further embodiment of any of the above, the trough further includes a first pivot stop determining the first position and a second pivot stop determining the second position.

In a further embodiment of any of the above, the at least one inner surface comprises an inner bottom surface, an inner proximal surface, an inner first side surface, and an inner second side surface.

In a further embodiment of any of the above, the abrasive surface is disposed on at least a portion of at least one of the inner bottom surface, the inner proximal surface, the inner first side surface, and the inner second side surface.

In a further embodiment of any of the above, the abrasive surface comprises an abrasive grit applied to at least a portion of the at least one inner surface.

In a further embodiment of any of the above, the abrasive surface comprises a roughening of a surface of at least a portion of the at least one inner surface.

In a further embodiment of any of the above, the abrasive surface comprises at least one ridge disposed on at least a portion of the at least one inner surface.

In a further embodiment of any of the above, the at least one ridge comprises a plurality of ridges disposed on at least a portion of the at least one inner surface.

In a further embodiment of any of the above, the at least one inner surface comprises an inner bottom surface, an inner proximal surface, an inner first side surface, and an inner second side surface.

In a further embodiment of any of the above, the plurality of ridges are disposed on at least a portion of at least one of the inner bottom surface, the inner proximal surface, the inner first side surface, and the inner second side surface.

In a further embodiment of any of the above, a plurality of slots are formed through at least a portion of the at least one inner surface, wherein the plurality of ridges comprises material of the at least one inner surface adjacent a respective one of the plurality of slots bent away from a plane of the at least one inner surface.

In a further embodiment of any of the above, a quantity of avian attractant is disposed in the attractant storage container.

In a further embodiment of any of the above, the attractant is selected from the group consisting of: avian feed, water, treat, and grit.

Other embodiments are also disclosed.

BRIEF DESCRIPTION OF DRAWINGS

The embodiments described herein and other features, advantages and disclosures contained herein, and the manner of attaining them, will become apparent and the present disclosure will be better understood by reference to the following description of various exemplary embodiments of the present disclosure taken in conjunction with the accompanying drawing, wherein.

DETAILED DESCRIPTION OF THE DISCLOSED EMBODIMENTS

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The presently disclosed embodiments include a container that is operative to trim the beak of a bird. An avian attractant is employed to encourage a bird to trim its beak by accessing the attractant from the container. One or more inner surfaces of the container include abrasive surfaces that, when contacted by the bird's beak, act to remove material incrementally from the beak, thus trimming the beak and keeping the beak trimmed.

Referring to FIGS. 1-6, one embodiment of a beak trimming device is illustrated schematically and indicated generally at 10. The beak trimming device 10 includes a feed trough 12 operative to receive a quantity of feed 14. Although the presently described embodiments describe use of the device with feed 14, it will be appreciated from the present disclosure that in other embodiments another attractant may be used, such as water, grit, treats, or another item or combination of items desirable to the bird. The feed trough 12 may receive the feed 14 by any desired means, such as manually placing the feed 14 into the feed trough 12 or directing the feed 14 into the feed trough 12 by means of a conveyor belt, to name two non-limiting examples. In the illustrated embodiments, the feed 14 enters an interior cavity 15 of the feed trough 12 from an overhead feed storage container 16 through an opening 18. The interior cavity 15 of the feed trough 12 has a distal end 17 and a proximal end 19.

In one embodiment, the feed trough 12 may be mounted to a bracket 20 coupled to the feed storage container 16 by means of one or more connectors 22. In other embodiments, the feed trough 12 may be mounted to the feed storage container 16 by other means, or not mounted thereto, as it will be appreciated by those skilled in the art that the manner in which the feed 14 is provided to the feed trough 12 is not critical. A biasing member may be provided on the feed trough 12, feed storage container 16, and/or bracket 20. In the illustrated embodiment, the biasing member comprises a weight 24 coupled to (or integrally formed with) a distal end 26 of the feed trough 12. In other embodiments, the biasing member may comprise a mechanical spring or gas spring, to name just two non-limiting examples. The feed 14 is accessed by the bird from the proximal end 28 of the feed trough 12.

Figure 1:
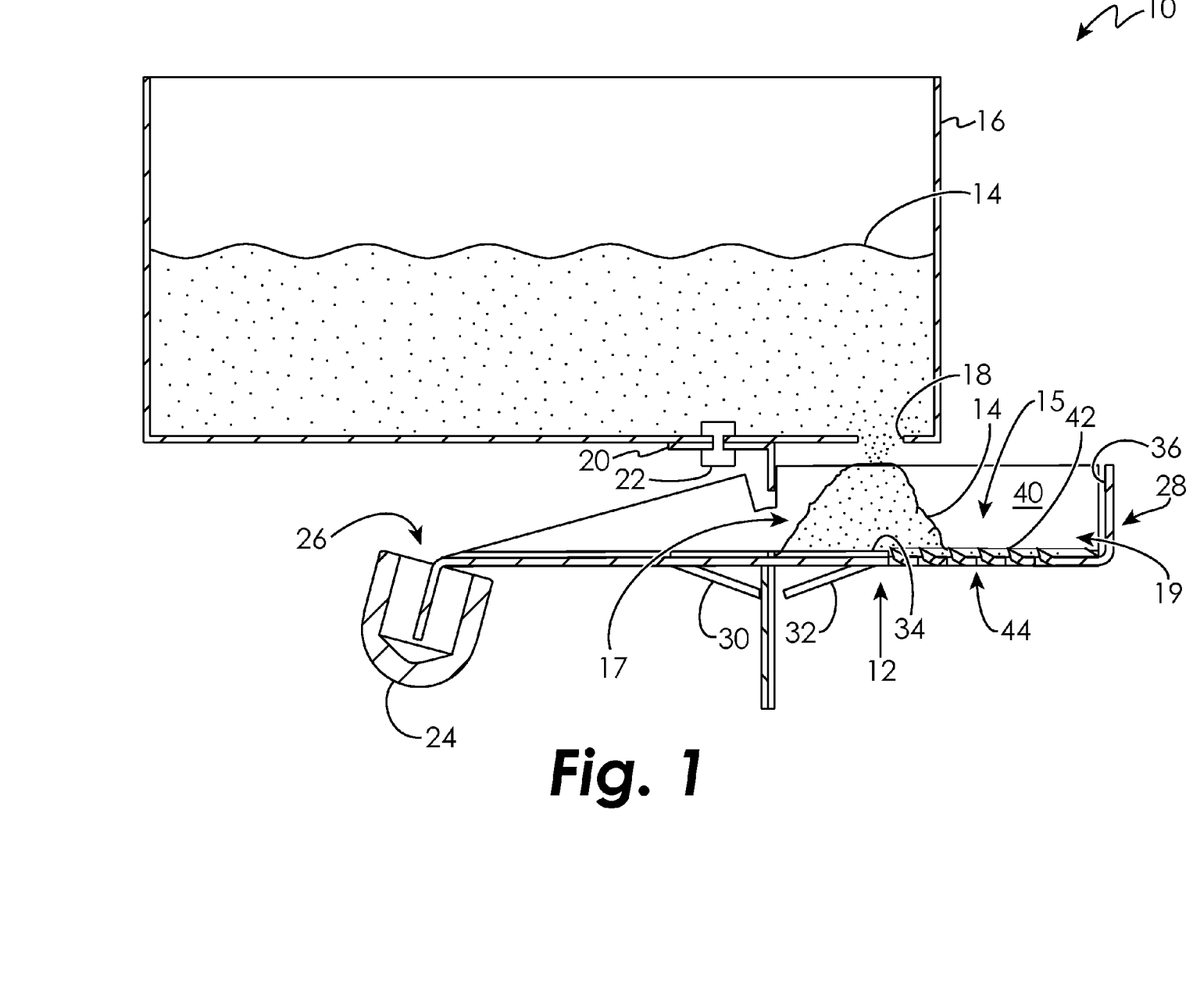
FIG. 1 is a cross-sectional side view of a beak trimming device according to an embodiment.
Figure 2:
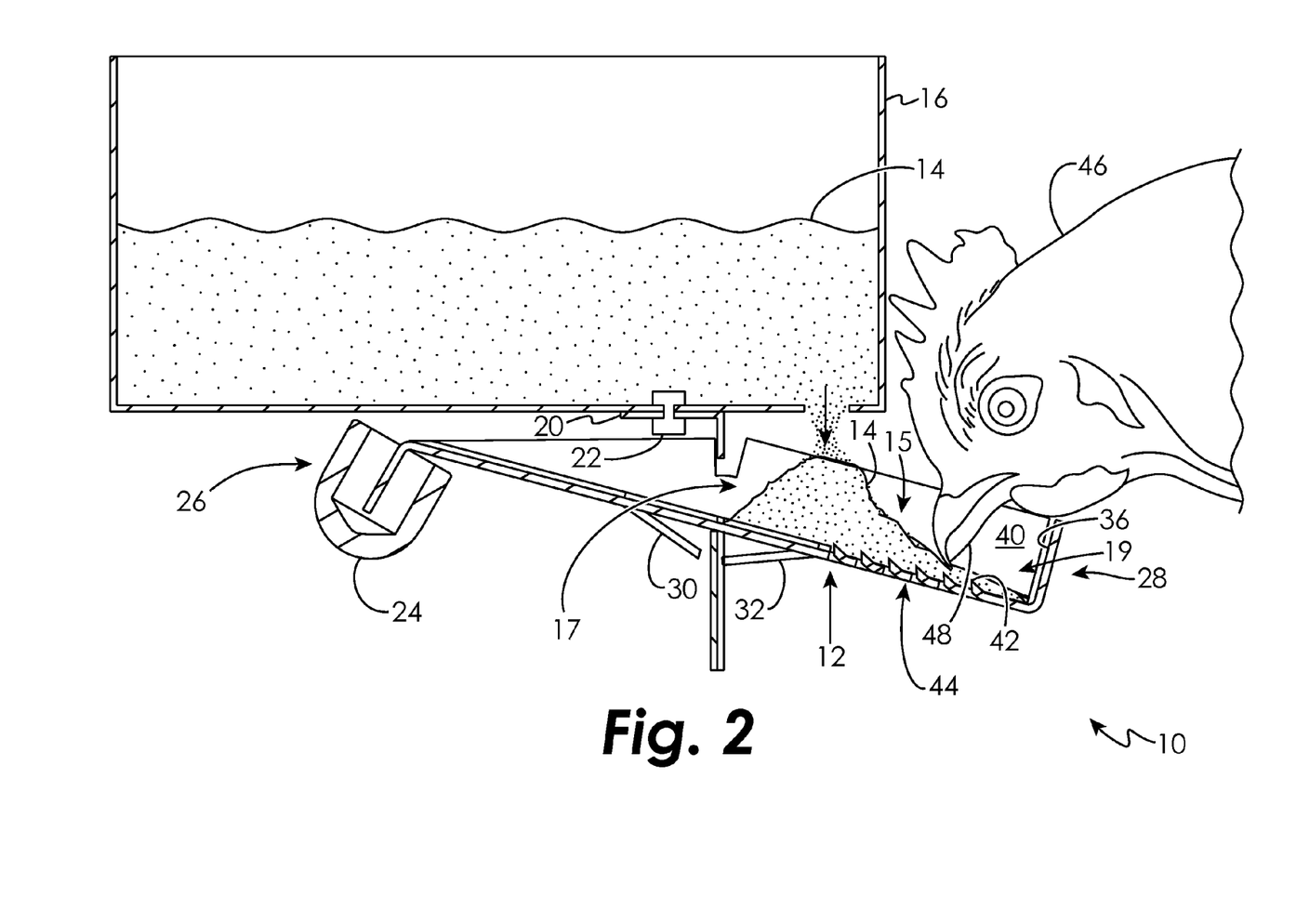
FIG. 2 is a cross-sectional side view of a beak trimming device according to an embodiment dispensing feed to an avian.
Figure 3:
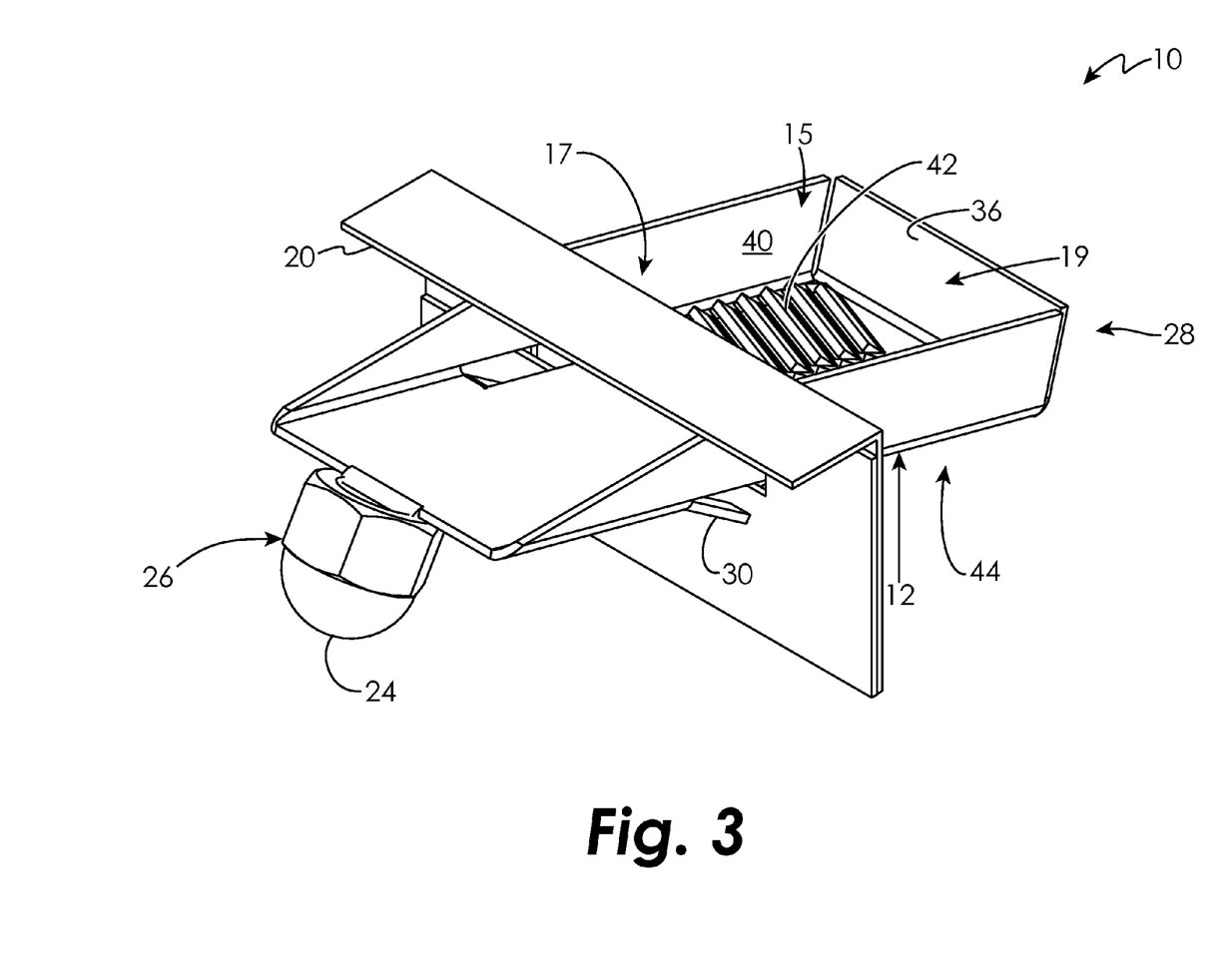
FIG. 3 is a top perspective view of a beak trimming device according to an embodiment.
Figure 4:
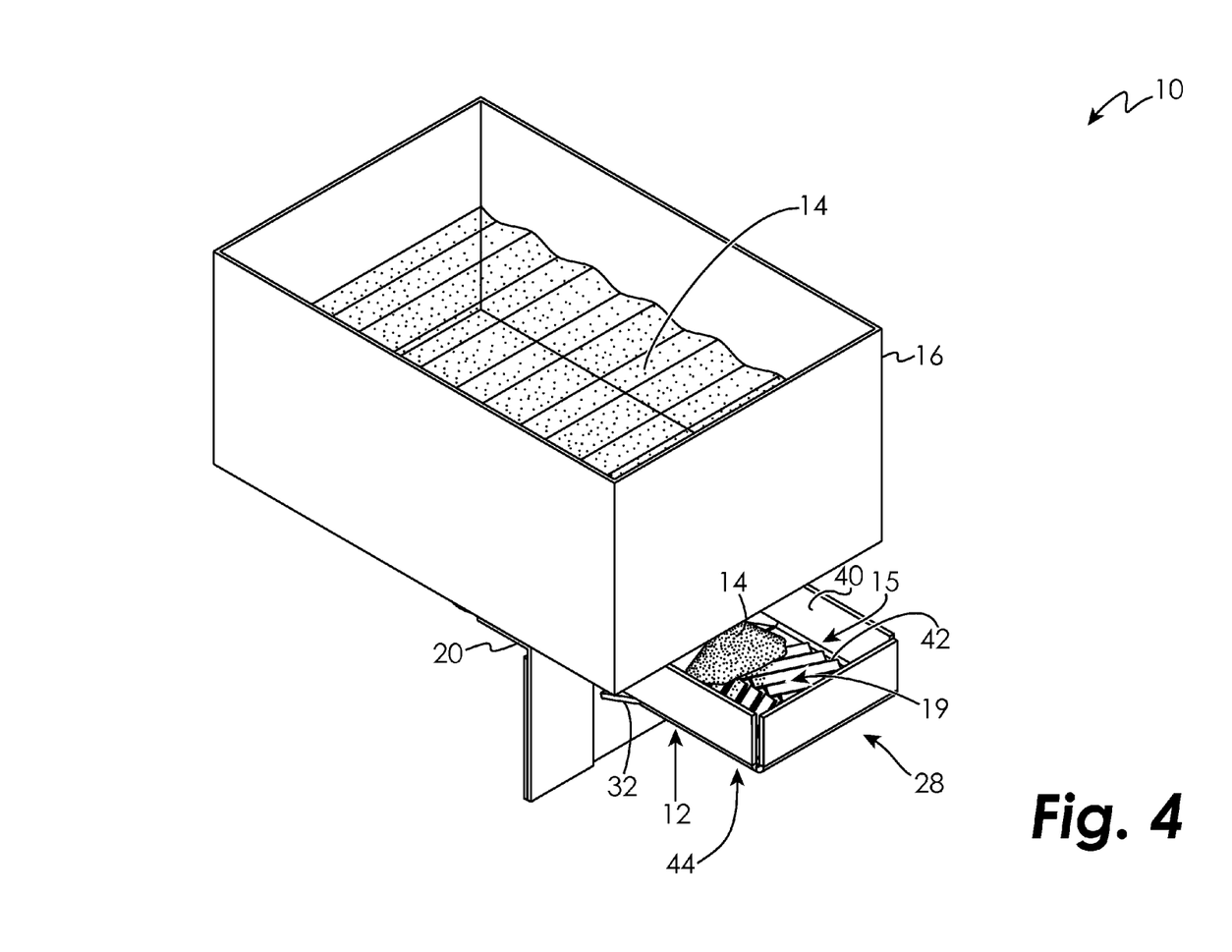
FIG. 4 is a top perspective view of a beak trimming device and feed storage container according to an embodiment.
Figure 5:
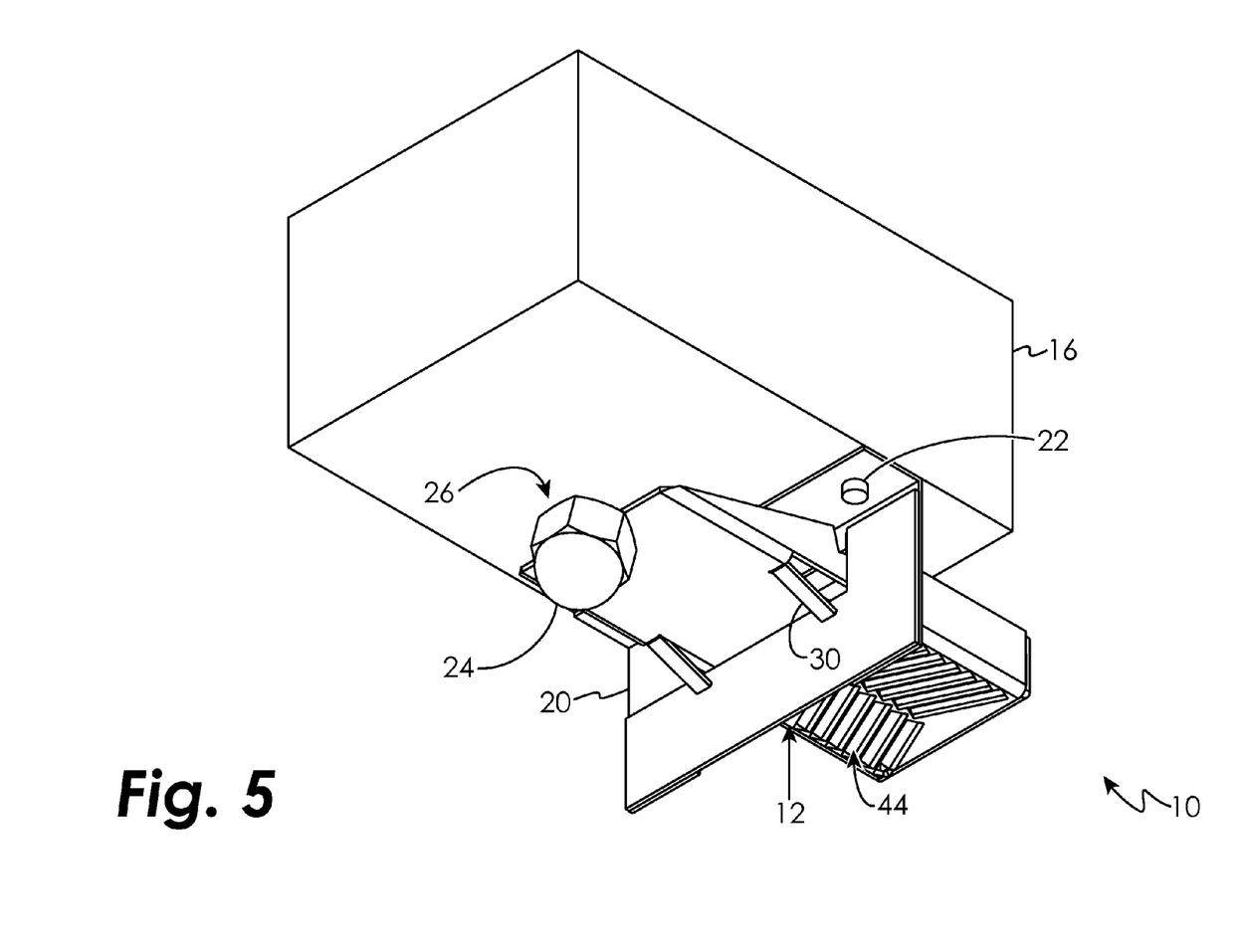
FIG. 5 is a bottom perspective view of a beak trimming device and feed storage container according to an embodiment.
Figure 6:
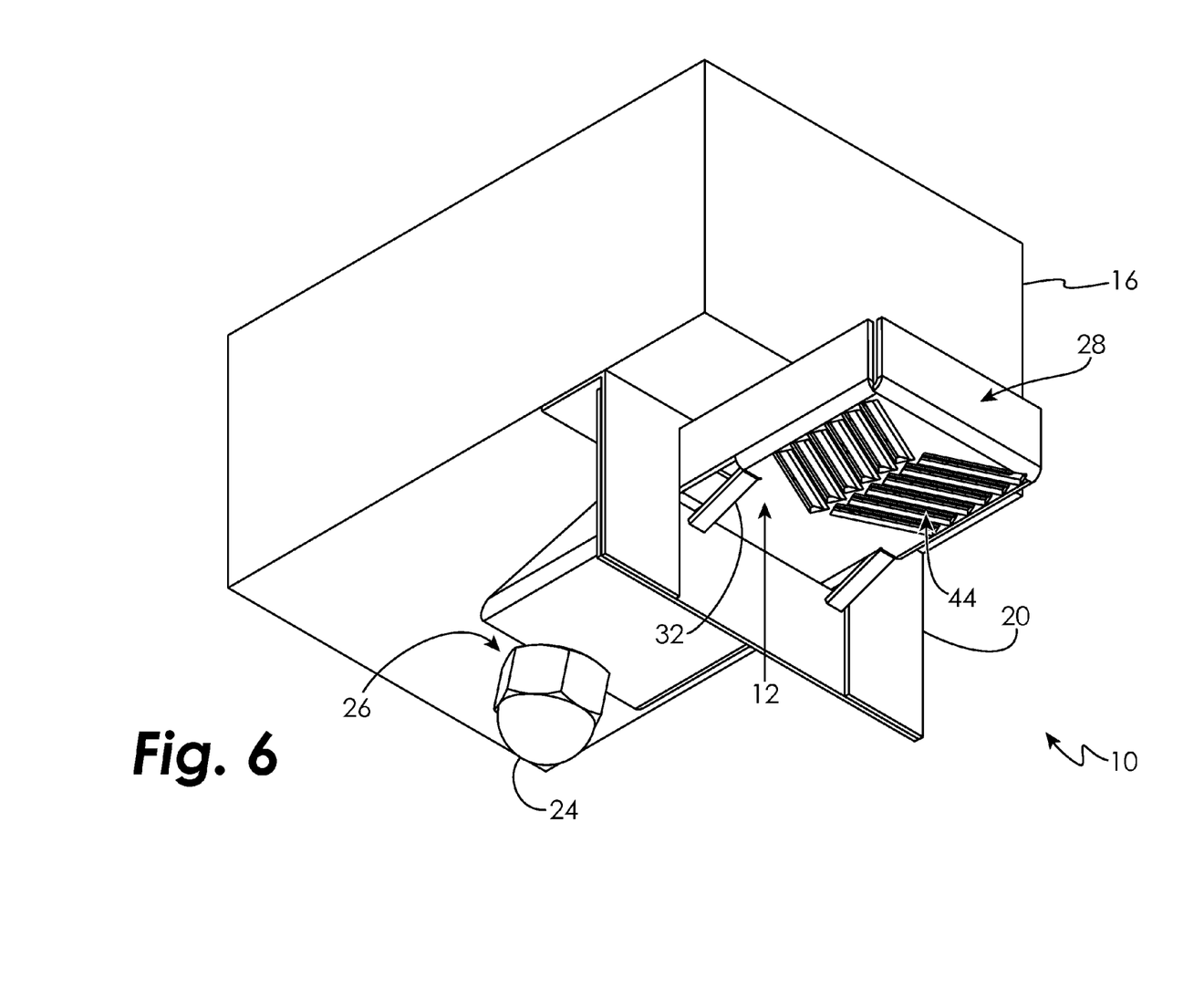
FIG. 6 is a bottom perspective view of a beak trimming device according to an embodiment.

In the illustrated embodiment, the feed trough 12 is operative to pivot in the bracket 20 between a first position shown in FIG. 1 and a second position shown in FIG. 2. A first pivot stop 30 and a second pivot stop 32 may be provided on the feed trough 12 to limit the range of pivoting motion of the feed trough 12 with respect to the bracket 20, as described in more detail hereinbelow.

The feed trough 12 includes an inner bottom surface 34, an inner proximal surface 36, an inner first side surface 38, and an inner second side surface 40. In other embodiments, the feed trough 12 may be formed in other configurations and shapes, with a greater or lesser number of surfaces. At least a portion of at least one of the inner surfaces 34-40 comprises an abrasive surface. An abrasive surface may comprise any material or configuration that is operative to remove material incrementally from the bird's beak when the beak is moved across the material.

For example, in some embodiments, the abrasive surface may comprise an abrasive grit applied to one of the inner surfaces or a roughening of the inner surface itself, to name just two non-limiting examples. In the embodiments of FIGS. 1-6, the abrasive surface comprises one or more ridges 42 protruding from an inner surface 34, 36, 38, and/or 40. Such ridges 42 may be may be integrally formed in, or may be machined into, the inner surface 34, 36, 38, and/or 40 in some embodiments. In other embodiments, such ridges 42 may be may be formed by cutting patterns into the inner surface 34, 36, 38, and/or 40 and then turning edges of the cut patterns up above the plane of the inner surface 34, 36, 38, and/or 40. Other abrasive surfaces may be used in other embodiments, as will be apparent to one of ordinary skill in the art in view of the present disclosure. In one embodiment, only the inner bottom surface 34 includes at least one ridge 42. In the illustrated embodiments, the inner bottom surface 34 includes a plurality of ridges 42. In the illustrated embodiments, the at least one ridge 42 and the plurality of ridges 42 are operative to remove material incrementally from a bird's beak when the beak is moved across the at least one ridge 42 or the plurality of ridges 42.

In one embodiment, one or more ridges 42 may be formed on one or more of the inner proximal surface 36, the inner first side surface 38, and the inner second side surface 40, either in addition to the one or more ridges 42 on the inner bottom surface 34 or in lieu of the one or more ridges 42 on the inner bottom surface 34. In the illustrated embodiment, the ridges 42 are formed by cutting slots 44 through the respective surface and bending a section of the respective surface adjacent the slot 44 upward to form the ridge 42. In other embodiments, the ridges 42 are formed by machining the respective surface or by forming the ridges 42 integrally with the respective surface, to name just two non-limiting examples.

In operation, the weight 24 functions to maintain the feed trough 12 in the position shown in FIG. 1, where the first pivot stop 30 limits the range of motion of the feed trough 12 when the first pivot stop 30 engages the bracket 20. In this position, some feed 14 is able to enter the distal end 17 of the inside 15 of the feed trough 12. The feed 14 disposed in the distal end 17 of the inside of the feed trough 12 acts as an attractant to the bird 46 (see FIG. 2), which soon learns that pushing down on the feed trough 12 with its beak 48 will cause the feed trough 12 to pivot downward, as shown in FIG. 2, causing some of the feed 14 to fall to the proximal end 19 of the inside of the feed trough 12, where it may be more easily accessed by the bird 46. The second pivot stop 32 limits the downward range of motion of the feed trough 12 when the second pivot stop 32 engages the bracket 20. As the bird 46 feeds on the feed 14 in the proximal end 19 of the inside of the feed trough 12, its beak 48 will naturally rub against the ridges 42 (or other abrasive surface), thereby incrementally removing material from the beak 48, thus keeping the beak 48 trimmed. In embodiments in which an abrasive surface is disposed on at least one of the inner proximal surface 36, the inner first side surface 38, and the inner second side surface 40, beak 48 will be trimmed when the bird 46 rubs its beak 48 on one of these surfaces, either inadvertently or to clean the beak 48.

It will be appreciated from the presently disclosed embodiments that use of an attractant like the feed 14, water, grit, or other desirable attractant, to guide the beak 48 to an abrasive surface disposed in a position where the beak 48 is likely to contact the abrasive surface when accessing the attractant, will function to remove material incrementally from the beak 48, thus trimming the beak and keeping the beak 48 trimmed. Although the disclosed embodiments illustrate the concept in relation to accessing feed 14 with a feed trough 12 of a particular design, the concept is not so limited. Therefore, while the embodiments have been illustrated and described in detail in the drawings and foregoing description, the same is to be considered as illustrative and not restrictive in character, it being understood that only certain embodiments have been shown and described and that all changes and modifications that come within the spirit of the embodiments are desired to be protected.

What is claimed is:

1. A beak trimming device comprising:
a trough including an interior cavity formed from at least one inner surface, the interior cavity having an interior cavity proximal end and an interior cavity distal end, wherein the interior cavity is constructed and arranged to hold a quantity of avian attractant therein; and
an abrasive surface disposed on at least a portion of the at least one inner surface, the abrasive surface constructed and arranged to remove material incrementally from an avian beak that is moved across the abrasive surface when accessing avian attractant;
wherein the abrasive surface comprises at least one ridge disposed on at least a portion of the at least one inner surface and at least one slot formed all the way through the at least one inner surface, wherein the at least one ridge comprises material of the at least one inner surface adjacent a respective one of the at least one slot bent away from a plane of the at least one inner surface; and wherein the trough is constructed and arranged to move attractant to the interior cavity proximal end upon contact of the avian beak with the at least one inner surface.

2. The device of claim 1, further comprising:
an attractant storage container including an opening therein, wherein the attractant storage container is disposed with respect to the trough such that attractant within the attractant storage container may pass through the opening into the interior cavity of the trough.

3. The device of claim 2, wherein the trough is operably coupled to the attractant storage container, wherein the coupling of the trough and attractant storage container is constructed and arranged such that attractant within the attractant storage container will move through the opening and into the trough by force of gravity.

4. The device of claim 2, wherein the trough is pivotally connected to the attractant storage container, and the trough is configured to pivot away from the opening upon the contact of the avian beak with the at least one inner surface.

5. The device of claim 2, further comprising a bracket operably coupling the trough to the attractant storage container, wherein the bracket is constructed and arranged such that attractant within the attractant storage container will move through the opening and into the trough by force of gravity.

6. The device of claim 5, wherein the bracket is constructed and arranged to allow the trough to pivot between a first position and a second position.

7. The device of claim 6, wherein the trough is configured to pivot to the second position upon the contact of the avian beak with the at least one inner surface.

8. The device of claim 6, wherein the trough includes a biasing member coercing the trough toward the first position.

9. The device of claim 8, wherein the biasing member is selected from the group consisting of: a weight, a mechanical spring, and a gas spring.

10. The device of claim 6, wherein the trough further includes a first pivot stop determining the first position and a second pivot stop determining the second position.

11. The device of claim 1, wherein the at least one inner surface comprises an inner bottom surface, an inner proximal surface, an inner first side surface, and an inner second side surface.

12. The device of claim 11, wherein the abrasive surface is disposed on at least a portion of at least one of the inner bottom surface, the inner proximal surface, the inner first side surface, and the inner second side surface.

13. The device of claim 1, wherein the at least one ridge comprises a plurality of ridges disposed on at least a portion of the at least one inner surface.

14. The device of claim 13, wherein the at least one inner surface comprises an inner bottom surface, an inner proximal surface, an inner first side surface, and an inner second side surface.

15. The device of claim 14, wherein the plurality of ridges are disposed on at least a portion of at least one of the inner bottom surface, the inner proximal surface, the inner first side surface, and the inner second side surface.

16. The device of claim 1, further comprising a quantity of avian attractant disposed in the interior cavity.

17. The device of claim 16, wherein the attractant is selected from the group consisting of: avian feed, water, treat, and grit.

18. A beak trimming device comprising:
a trough including an interior cavity formed from at least one inner surface, the interior cavity having an interior cavity proximal end and an interior cavity distal end;
an attractant storage container including an opening therein, wherein the attractant storage container is disposed with respect to the trough such that avian attractant within the attractant storage container may pass through the opening into the interior cavity of the trough; and
an abrasive surface disposed on at least a portion of the at least one inner surface, the abrasive surface constructed and arranged to remove material incrementally from an avian beak that is moved across the abrasive surface when accessing avian attractant;
wherein the abrasive surface comprises at least one ridge disposed on at least a portion of the at least one inner surface and at least one slot formed all the way through the at least one inner surface, wherein the at least one ridge comprises material of the at least one inner surface adjacent a respective one of the at least one slot bent away from a plane of the at least one inner surface; and
wherein the trough is constructed and arranged to move attractant to the interior cavity proximal end upon contact of the avian beak with the at least one inner surface.

19. The device of claim 18, wherein the trough is operably coupled to the attractant storage container, wherein the coupling of the trough and the attractant storage container is constructed and arranged such that attractant within the attractant storage container will move through the opening and into the trough by force of gravity.

20. The device of claim 18, wherein the trough is pivotally connected to the attractant storage container, and the trough is configured to pivot away from the opening upon the contact of the avian beak with the at least one inner surface.

21. The device of claim 18, further comprising a bracket operably coupling the trough to the attractant storage container, wherein the bracket is constructed and arranged such that attractant within the attractant storage container will move through the opening and into the trough by force of gravity.

22. The device of claim 21, wherein the bracket is constructed and arranged to allow the trough to pivot between a first position and a second position.

23. The device of claim 22, wherein the trough is configured to pivot to the second position upon the contact of the avian beak with the at least one inner surface.

24. The device of claim 22, wherein the trough includes a biasing member coercing the trough toward the first position.

25. The device of claim 24, wherein the biasing member is selected from the group consisting of: a weight, a mechanical spring, and a gas spring.

26. The device of claim 22, wherein the trough further includes a first pivot stop determining the first position and a second pivot stop determining the second position.

27. The device of claim 18, wherein the at least one inner surface comprises an inner bottom surface, an inner proximal surface, an inner first side surface, and an inner second side surface.

28. The device of claim 27, wherein the abrasive surface is disposed on at least a portion of at least one of the inner bottom surface, the inner proximal surface, the inner first side surface, and the inner second side surface.

29. The device of claim 18, wherein the at least one ridge comprises a plurality of ridges disposed on at least a portion of the at least one inner surface.

30. The device of claim 29, wherein the at least one inner surface comprises an inner bottom surface, an inner proximal surface, an inner first side surface, and an inner second side surface.

31. The device of claim 30, wherein the plurality of ridges are disposed on at least a portion of at least one of the inner bottom surface, the inner proximal surface, the inner first side surface, and the inner second side surface.

32. The device of claim 18, further comprising a quantity of avian attractant disposed in the attractant storage container.

33. The device of claim 32, wherein the attractant is selected from the group consisting of: avian feed, water, treat, and grit.

* * * * *